(12) United States Patent
Strock (10) Patent No.: US 10,450,876 B2
(45) Date of Patent: Oct. 22, 2019

(54) ABRASIVE TIP BLADE MANUFACTURE METHODS

(71) Applicant: United Technologies Corporation, Hartford, CT (US)

(72) Inventor: Christopher W. Strock, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 754 days.

(21) Appl. No.: 14/687,648

(22) Filed: Apr. 15, 2015

(65) Prior Publication Data

US 2016/0305257 A1 Oct. 20, 2016

(51) Int. Cl.

| F01D 5/14 | (2006.01) |
|---|---|
| F01D 5/28 | (2006.01) |
| F01D 11/12 | (2006.01) |
| F01D 25/24 | (2006.01) |
| F04D 29/32 | (2006.01) |

(Continued)

(52) U.S. Cl.
CPC .............. *F01D 5/288* (2013.01); *F01D 5/147* (2013.01); *F01D 11/122* (2013.01); *F01D 25/24* (2013.01); *F04D 29/023* (2013.01); *F04D 29/324* (2013.01); *F04D 29/388* (2013.01); *F05D 2220/32* (2013.01); *F05D 2220/36* (2013.01); *F05D 2230/31* (2013.01); *F05D 2230/90* (2013.01); *F05D 2240/307* (2013.01); *F05D 2300/10* (2013.01); *F05D 2300/121* (2013.01); *F05D 2300/22* (2013.01); *F05D 2300/506* (2013.01); *F05D 2300/514* (2013.01); *F05D 2300/6032* (2013.01); *F05D 2300/611* (2013.01); *F05D 2300/6111* (2013.01)

(58) Field of Classification Search
CPC ........ F01D 5/286; F01D 5/288; F01D 11/122; F05D 2230/31; F05D 2230/90; F05D 2240/307; F05D 2300/611
See application file for complete search history.

(56) References Cited

U.S. PATENT DOCUMENTS

| 3,575,427 A | | 4/1971 | Lapac et al. | |
|---|---|---|---|---|
| 4,386,112 A | * | 5/1983 | Eaton ...................... | B05D 1/10 427/422 |

(Continued)

FOREIGN PATENT DOCUMENTS

| EP | 2907975 A1 | 8/2015 |
|---|---|---|
| WO | 2014-120116 A1 | 8/2014 |

(Continued)

OTHER PUBLICATIONS

Internet print-out of http://web.archive.org/web/20130210151413/https://www.rolledalloys.com/alloys/titanium-alloys/6al-4v/en/.*

(Continued)

*Primary Examiner* — Woody A Lee, Jr.
*Assistant Examiner* — Christopher R Legendre
(74) *Attorney, Agent, or Firm* — Bachman & LaPointe, P.C.

(57) ABSTRACT

A blade comprises an airfoil having a root end and a tip. A metallic substrate is along at least a portion of the airfoil. An abrasive tip coating comprises an abrasive and an aluminum-based matrix. An aluminum-based base layer is between the tip coating and the substrate.

18 Claims, 5 Drawing Sheets

(51) Int. Cl.
*F04D 29/38* (2006.01)
*F04D 29/02* (2006.01)

(56) References Cited

U.S. PATENT DOCUMENTS

| | | | | |
|---|---|---|---|---|
| 4,566,700 | A * | 1/1986 | Shiembob | C23C 28/00 |
| | | | | 277/415 |
| 4,808,055 | A * | 2/1989 | Wertz | B23P 6/007 |
| | | | | 29/402.16 |
| 5,076,897 | A * | 12/1991 | Wride | B24D 99/00 |
| | | | | 205/110 |
| 5,137,426 | A * | 8/1992 | Rhoda | C23C 4/02 |
| | | | | 416/191 |
| 5,453,329 | A * | 9/1995 | Everett | C23C 24/103 |
| | | | | 219/121.66 |
| 5,897,920 | A * | 4/1999 | Sileo | C23C 4/10 |
| | | | | 427/450 |
| 6,334,617 | B1 | 1/2002 | Putnam et al. | |
| 6,706,319 | B2 * | 3/2004 | Seth | B24D 18/00 |
| | | | | 427/190 |
| 6,815,087 | B2 * | 11/2004 | Takagi | B32B 15/012 |
| | | | | 148/516 |
| 7,892,652 | B2 * | 2/2011 | Strock | C23C 4/04 |
| | | | | 106/1.05 |
| 7,998,604 | B2 * | 8/2011 | Reynolds | C23C 4/06 |
| | | | | 428/469 |
| 8,020,875 | B2 | 9/2011 | Putnam et al. | |
| 8,807,955 | B2 * | 8/2014 | Wrabel | F01D 5/005 |
| | | | | 416/241 R |
| 2003/0126800 | A1 | 7/2003 | Seth et al. | |
| 2009/0311552 | A1 | 12/2009 | Manier et al. | |
| 2012/0099970 | A1 * | 4/2012 | Strock | F01D 5/06 |
| | | | | 415/173.4 |
| 2012/0107103 | A1 * | 5/2012 | Kojima | F01D 11/122 |
| | | | | 415/173.4 |
| 2013/0004328 | A1 | 1/2013 | Wrabel et al. | |
| 2013/0156588 | A1 | 6/2013 | Murdock et al. | |
| 2013/0340403 | A1 * | 12/2013 | Anand | C23C 30/00 |
| | | | | 60/39.52 |
| 2015/0354376 | A1 * | 12/2015 | Garosshen | C23F 13/14 |
| | | | | 60/805 |
| 2016/0305257 | A1 * | 10/2016 | Strock | F04D 29/388 |
| 2016/0305258 | A1 * | 10/2016 | Strock | B05B 7/1481 |
| 2017/0362952 | A1 * | 12/2017 | Stoyanov | F01D 11/122 |

FOREIGN PATENT DOCUMENTS

| | | |
|---|---|---|
| WO | 2014-120117 A1 | 8/2014 |
| WO | 2014149365 A1 | 9/2014 |

OTHER PUBLICATIONS

Internet print-out of https://www.steelexpress.co.uk/steel-hardness-conversion.html (retrieved Sep. 13, 2018).*
European Search Report for EP Patent Application No. 16165646.7, dated Oct. 7, 2016.
Sulzer Metco, Thermal Spray Materials Guide, Mar. 2012, p. 26, Sulzer Metco, Winterthur, Switzerland.
Oerlikon Metco, Material Product Data Sheet Alumina/Nickel Aluminum Cermet Thermal Spray Powder, 2014, Winterthur, Switzerland.
European Office action dated Apr. 4, 2018 for EP Patent Application No. 16165646.7.

* cited by examiner

ABRASIVE TIP BLADE MANUFACTURE METHODS

BACKGROUND

The disclosure relates to blades and rub coatings. More particularly, the disclosure relates to abrasive blade tips for cooperating with abradable coatings on turbomachines such as gas turbine engines.

Abradable coatings (rub coatings) protect moving parts from damage during rub interaction and wear to establish a mating surface to the moving parts with smallest possible clearance. The coatings are used in turbomachines to interface with the tips of a rotating blade stage, tips of cantilevered vanes and knife edge seals.

In an exemplary turbomachine such as a gas turbine engine, more particularly, a turbofan engine, coatings may be used to interface with the blade tips of fan blade stages, compressor blade stages, and turbine blade stages. Because temperature generally increases through the fan and compressor and is yet much higher in the turbine, different blade materials, surrounding case materials, and coating materials may be desired at different locations along the engine.

With relatively low temperatures in the fan and compressor sections, relatively low temperature materials may be used for their blades and the surrounding cases (at least through upstream (lower pressure) portions of the compressor). The exemplary blade materials in such lower temperature stages may be aluminum alloy, titanium alloy, carbon fiber or other composite, combinations thereof, and the like. Similarly, relatively lower temperature case materials may be provided. Particularly because the case material is not subject to the centrifugal loading that blades are, even lower temperature capability materials may be used (e.g., aramid or other fiber composites) in the case than in the blades.

US Patent Application Publication 20130156588 A1, published Jun. 20, 2013, and entitled "Electrical grounding for fan blades", discloses blades having polyurethane-coated aluminum substrates.

It is known to use a coating along the inboard or inner diameter (ID) surface of the case component to interface with the blade tips. Such coatings serve to protect blade tips from damage during rub contact between the blades and case. When the blade tips are protected from damage during rub, clearance between the blades and case ID can be set closer and tighter operating clearance can be achieved.

To limit blade damage, the adjacent surfaces of the surrounding shroud may be formed by an abradable rub coating. Examples of abradable rub coatings are found in U.S. Pat. Nos. 3,575,427, 6,334,617, and 8,020,875. One exemplary baseline coating comprises a silicone matrix with glass micro-balloon filler. Without the glass filler, the elastic properties of the abradable coating result in vibrational resonances and non-uniform rub response. The glass increases the effective modulus of the coating so as to reduce deformation associated with aerodynamic forces and resonances. More recent proposals include filler such as polymer micro-balloons (PCT/US2013/023570) and carbon nanotubes (PCT/US2013/023566).

For interfacing with the abradable rub coating, the blade tips may bear an abrasive coating. US Patent Application Publication 2013/0004328 A1, published Jan. 3, 2013, and entitled "ABRASIVE AIRFOIL TIP" discloses a number of such coatings.

SUMMARY

One aspect of the disclosure involves a blade comprising an airfoil having a root end and a tip. A metallic substrate is along at least a portion of the airfoil. An abrasive tip coating comprises an abrasive and an aluminum-based matrix. An aluminum-based base layer is between the tip coating and the substrate.

A further embodiment may additionally and/or alternatively include the base layer being essentially free of the abrasive.

A further embodiment may additionally and/or alternatively include the aluminum-based matrix being essentially the same as the base layer.

A further embodiment may additionally and/or alternatively include the matrix and the base layer being softer than the substrate.

A further embodiment may additionally and/or alternatively include the matrix being galvanically sacrificial to the base layer and the substrate.

A further embodiment may additionally and/or alternatively include at least one of: the base layer being at least 30% softer than the substrate; and the base layer having a yield strength at least 30% less than a yield strength of the substrate.

A further embodiment may additionally and/or alternatively include the substrate being aluminum-based.

Another aspect of the disclosure is a method for manufacturing a blade. The blade comprises an airfoil having a root end and a tip. A metallic substrate along at least a portion of the airfoil. An abrasive tip coating comprises an abrasive and an aluminum-based matrix. The method comprises: simultaneous spraying of the matrix and the abrasive; and, prior to the simultaneous spraying, spraying an aluminum-based base layer atop the substrate.

A further embodiment may additionally and/or alternatively include the abrasive being a non-oxide abrasive.

A further embodiment may additionally and/or alternatively include the base layer being sprayed to a thickness of 0.5 to 4.0 times a characteristic dimension of particles of the abrasive.

A further embodiment may additionally and/or alternatively include the base layer being sprayed to a thickness of 13 micrometers to 0.9 millimeter.

A further embodiment may additionally and/or alternatively include the abrasive tip coating having a content of the abrasive of at least ten volume percent.

A further embodiment may additionally and/or alternatively include the matrix being at least 75 weight percent aluminum and the abrasive filling the matrix to at least 10 volume percent.

A further embodiment may additionally and/or alternatively include the tip coating having a characteristic thickness of 0.1 mm to 0.3 mm.

A further embodiment may additionally and/or alternatively include the abrasive having a characteristic size of 30 micrometers to 200 micrometers.

A further embodiment may additionally and/or alternatively include applying a polymeric coating to a pressure side and a suction side of the airfoil.

A further embodiment may additionally and/or alternatively include a blade manufactured according to the methods.

A further embodiment may additionally and/or alternatively include a rotor comprising a circumferential array of the blades.

A further embodiment may additionally and/or alternatively include a gas turbine engine comprising the rotor and a case encircling the rotor. The case has a substrate and a coating on an inner surface of the substrate facing the rotor.

A further embodiment may additionally and/or alternatively include a method for using the blade. The method comprises causing the tip coating to abrade an adjacent coating.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
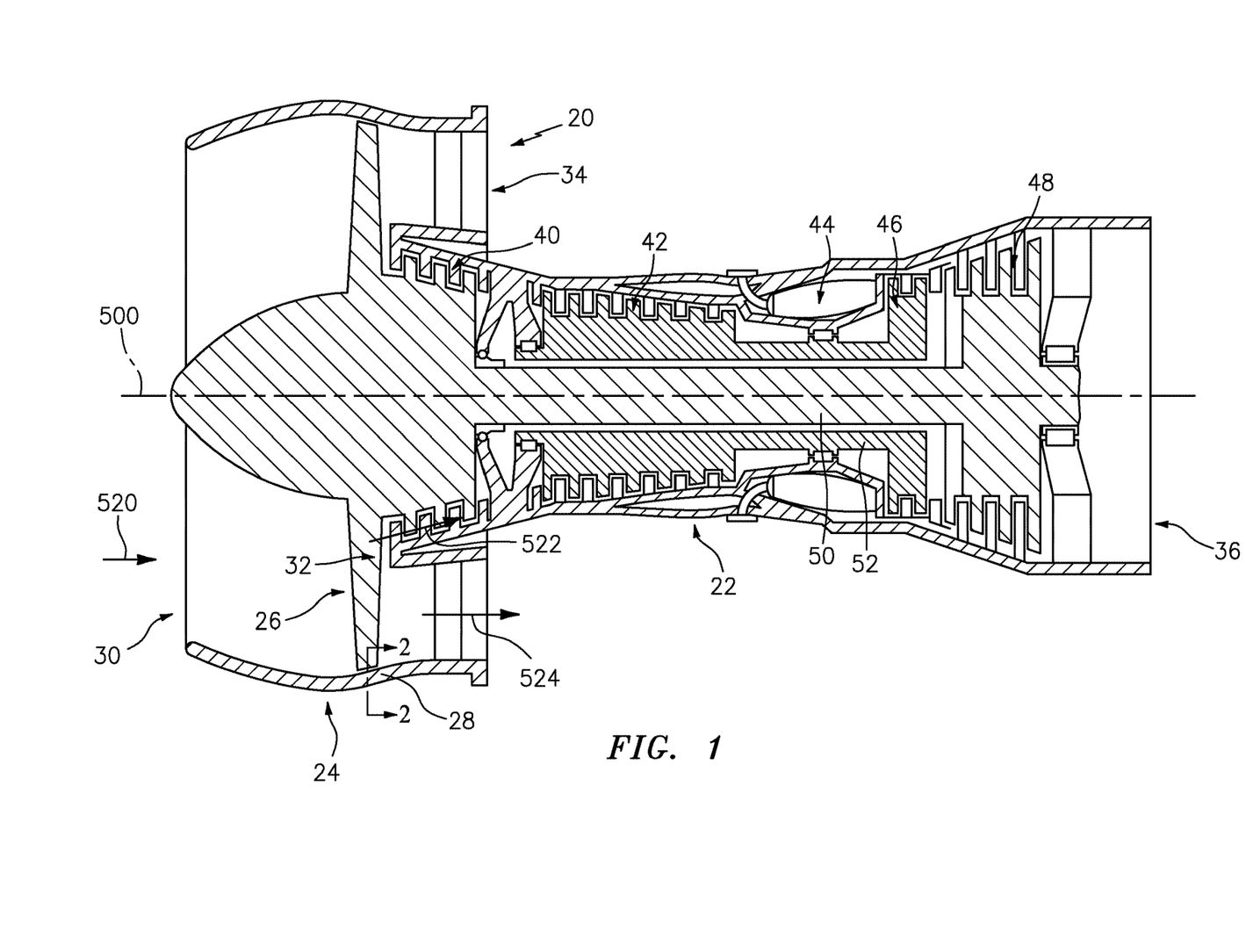
FIG. 1 is a partially schematic half-sectional view of a turbofan engine.

FIG. 1 shows a gas turbine engine 20 having an engine case 22 surrounding a centerline or central longitudinal axis 500. An exemplary gas turbine engine is a turbofan engine having a fan section 24 including a fan 26 within a fan case 28. The exemplary engine includes an inlet 30 at an upstream end of the fan case receiving an inlet flow along an inlet flowpath 520. The fan 26 has one or more stages 32 of fan blades. Downstream of the fan blades, the flowpath 520 splits into an inboard portion 522 being a core flowpath and passing through a core of the engine and an outboard portion 524 being a bypass flowpath exiting an outlet 34 of the fan case.

The core flowpath 522 proceeds downstream to an engine outlet 36 through one or more compressor sections, a combustor, and one or more turbine sections. The exemplary engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the exemplary engine, the blade stages of the LPC and LPT are part of a low pressure spool mounted for rotation about the axis 500. The exemplary low pressure spool includes a shaft (low pressure shaft) 50 which couples the blade stages of the LPT to those of the LPC and allows the LPT to drive rotation of the LPC. In the exemplary engine, the shaft 50 also drives the fan. In the exemplary implementation, the fan is driven via a transmission (not shown, e.g., a fan gear drive system such as an epicyclic transmission) to allow the fan to rotate at a lower speed than the low pressure shaft.

The exemplary engine further includes a high pressure shaft 52 mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

Figure 2:
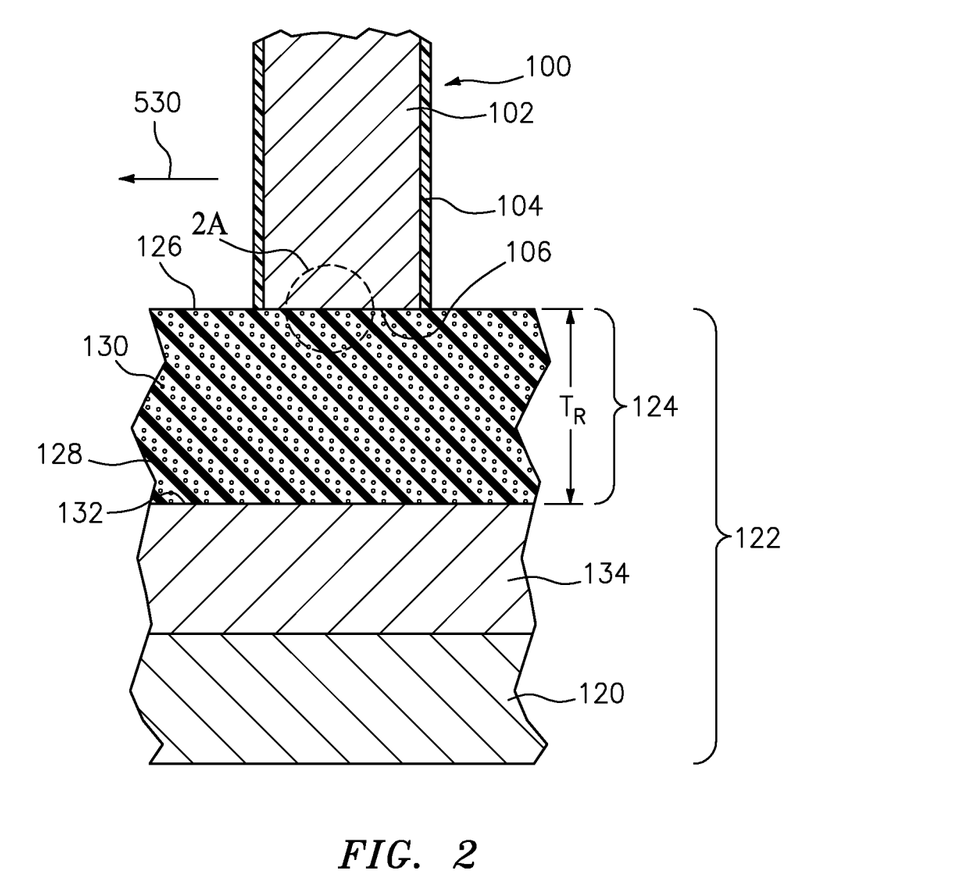
FIG. 2 is an enlarged transverse cutaway view of a fan blade tip region of the engine of FIG. 1 taken along line 2-2 and showing a first rub coating.

FIG. 2 shows a cutaway blade 100 showing a blade substrate (e.g., an aluminum alloy) 102 and a polymeric coating 104 (e.g., a polyurethane-based coating) on the substrate. The exemplary coating is along pressure and suction sides and spans the entire lateral surface of the blade between the leading edge and trailing edge. The exemplary coating, however, is not on the blade tip 106. If originally applied to the tip, the coating may have been essentially worn off during rub. Circumferential movement in a direction 530 is schematically shown.

FIG. 2 also shows an overall structure of the fan case facing the blade. This may include, in at least one example, a structural case 120. It may also include a multi-layer liner assembly 122. An inboard layer of the liner assembly may be formed by a rub material 124. The exemplary rub material 124 has an inboard/inner diameter (ID) surface 126 facing the blade tips and positioned to potentially rub with such tips during transient or other conditions.

The exemplary rub material 124 comprises a polymeric matrix material 128 and a filler 130 (e.g., polymeric particles or micro-balloons or glass micro-balloons). The exemplary rub material may be formed as a coating on an ID surface 132 of a substrate 134 of the liner assembly. An exemplary substrate 134 is titanium alloy AMS 4911. The rub material is shown as having an overall thickness $T_R$. Exemplary $T_R$ is 1 mm to 10 mm, more particularly, 3 mm to 6 mm. Alternative abradable rub material may include metal matrix composites (e.g., formed by thermal spray coating).

Figure 2A:
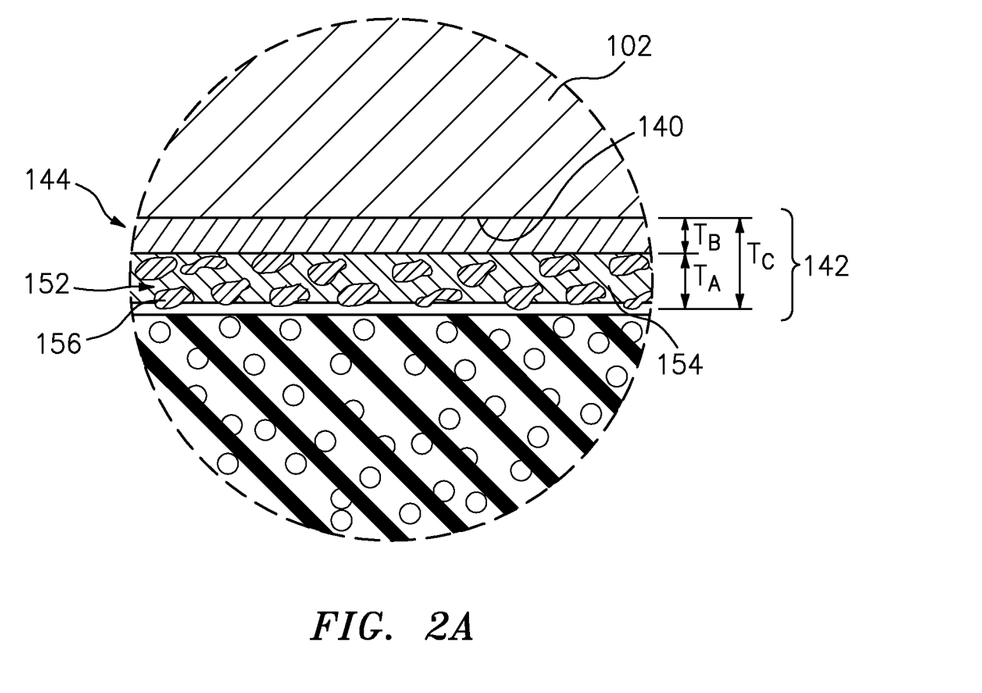
FIG. 2A is an enlarged view of a blade tip region of FIG. 2.

FIG. 2A shows the tip region 106 with a tip surface 140 of the substrate bearing a coating 142. The coating 142 comprises a base layer 144 and an abrasive layer 152. The layer 152 comprises matrix 154 and abrasive 156. The coating has a thickness $T_C$. Of that, exemplary base layer thickness is $T_B$ and abrasive layer thickness is $T_A$.

A baseline coating without the base layer is disclosed in International Application PCT/US2015/015381, filed Feb. 11, 2015, the disclosure of which is incorporated herein in its entirety as if set forth at length (the WO '381 application). That application disclosed co-spray of an aluminum-based matrix and an abrasive to a substrate. Application of the base layer 144 may offer one or more advantages. In the baseline process, relatively soft matrix (plus abrasive) starts to build up on the relatively hard (compared to the matrix) substrate. Early in the spray process, when the applied matrix is still thin, impacting abrasive particles produce a peening effect and disrupt the bond between matrix and substrate. This may lead to spalling of the coating.

If a soft base layer is applied to a threshold thickness before spray of the abrasive, this effect can be ameliorated. The thickness allows the base layer to absorb the impact of the abrasive and isolate the interface between the substrate and base layer. Because the base layer is also more compliant than the substrate there is not the same delamination effect between abrasive layer and base layer that there was between baseline abrasive layer and substrate.

Exemplary $T_A$ is 2 mils to 35 mils (50 micrometers to 0.9 mm), more particularly, 4 mils to 12 mils (0.1 mm to 0.3 mm). Exemplary $T_B$ may depend on a number of factors. Size, density, and spray velocity of the abrasive may positively correlate with desired thickness as may substrate hardness and the like. Exemplary $T_B$ at initial spray of abrasive may be at least one-half the characteristic abrasive particle dimension. More particularly, it may be between one-half and four times that dimension or between one and three times that dimension or one to two times that dimension. Particularly, if the same material is used for the base layer as is for the abrasive layer matrix, the final boundary between base layer and abrasive layer may be more difficult to define due to partial embedding of initial abrasive into the base layer (if any) or due to whatever portion of codeposited matrix intervenes between individual abrasive particles and the base layer.

Consider, for example, exemplary "220 mesh" abrasive which corresponds to a linear particle dimension of about 70 micrometers (about 3 mils). Exemplary $T_B$ for use with such abrasive is 4 mils to 7 mils (0.10 millimeter to 0.18 millimeter), more broadly 1 mil to 20 mils (25 micrometers to 0.51 millimeter). With a broader range of abrasive size, a broader range is applicable such as 0.5 mils to 30 mils (13 micrometers to 0.76 millimeter). As a practical matter, the lower end of the range is limited by providing benefit. Thickness much smaller than the abrasive particle size does not substantially reduce stresses experienced by the interface as a result of the peening caused by impinging grit particles. The upper end is not so limited, but may be limited simply by diminishing return and cost. Thus, any of the lower limits above may serve as lower limits for open ended ranges and may be paired with any of the upper limits. Alternative upper limits include 1.0 millimeter and 0.90 millimeter.

Exemplary matrix material is aluminum or aluminum alloy. One exemplary alloy is 88-12 Al—Si. Other matrix alloys for galvanic protection of the substrate are discussed below. Exemplary abrasive is alumina and/or zirconia or alumina-based and/or zirconia-based (e.g., at least 50% alumina and/or zirconia by weight or alumina or zirconia as a largest by-weight component). A particular abrasive is Metco 105NS from Sulzer Metco (US) Inc. Westbury, N.Y. A characteristic particle size and morphology is 15 micrometers to 45 micrometers 98 wt % pure alumina particles produced by fusing and crushing. An exemplary range is 15 micrometers to 250 micrometers or 30 micrometers to 200 micrometers or 50 micrometers to 200 micrometers. Due to distribution uniformity issues, it may be that only a by weight majority of the abrasive falls within a general range such as these. Similarly, characteristic (nominal or average (e.g., mean or median by weight)) sizes may fall within such ranges.

In one family of examples, the base layer is formed from the same material used as the matrix. Whereas an exemplary baseline method involves simultaneously starting sprays of the matrix and abrasive, a modified method may involve simply delaying the start of abrasive spray until a desired matrix material thickness has built up. This may effectively form a thickness $T_B$ of the base layer.

An exemplary manufacture process involves forming the blade substrate by conventional means (e.g., forging and/or machining and peening). Portions of the blade may be masked. For example, some blade configurations have a titanium leading edge separated from an aluminum substrate by a slight gap (e.g., epoxy-filled for galvanic isolation). The tip surface of the titanium leading edge member and the gap may be masked so that the abrasive coating does not electrically bridge the aluminum substrate and titanium leading edge.

Exemplary masking methods may include silicone thermal spray masking tape in combination with a sheet of rubber to cover the majority of the part. Masking may additionally or alternatively include shadow masking where the shadow mask is spaced apart from the tip. In shadow masking, the gun may be traversed relative to the part. During a portion of the traversal, the mask partially occludes a portion of the deposition area leading to a relatively thick coating in the center of the area, thinning toward the periphery.

For blades having polymer coatings on the airfoil pressure and suction side surfaces, such coating could also be used to mask if the polymer coating was applied before rather than after applying the abrasive coating.

Thereafter the base layer and abrasive layer may be applied. Exemplary abrasive coating is applied by codeposition after an initial interval of applying matrix material for the base layer. An exemplary codeposition involves simultaneous thermal (e.g., air plasma) spray of aluminum powder (for the matrix) and alumina (for the abrasive). Exemplary codeposition involves a system 200 (FIG. 3) with a single plasma gun 202 (having a plasma gas source 201) and separate powder sources 204A, 204B (e.g., powder feeders with separate injection nozzles 206A, 206B coupled to carrier gas sources 207A, 207B) for introducing streams of matrix 208 and abrasive material 210 to the plasma 212. During the spray process, the aluminum and aluminum oxide particles are at least partially melted.

Figure 4:
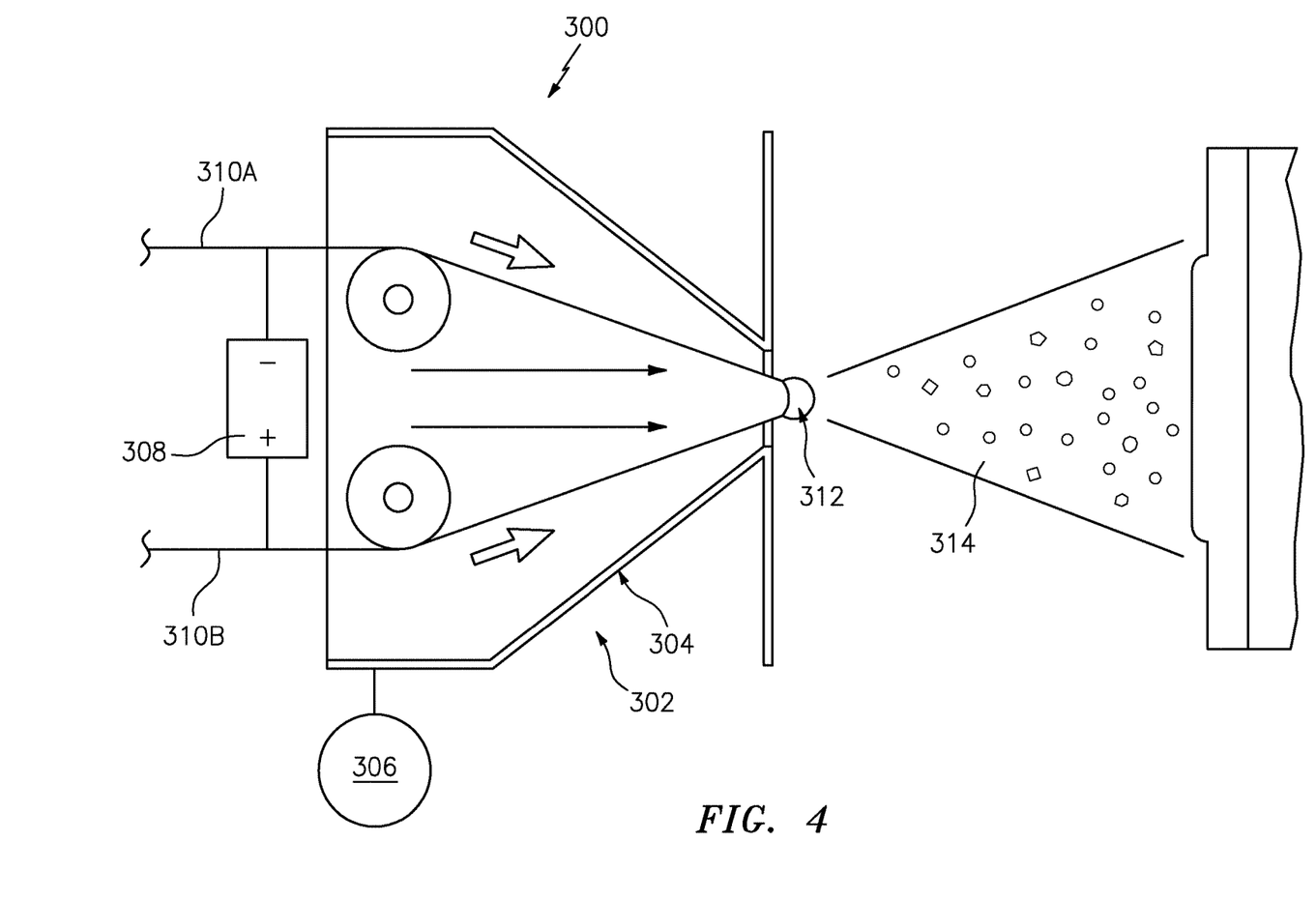
FIG. 4 is a view of a twin-wire spray apparatus depositing an abrasive tip coating.

An alternative codeposition process is a twin wire arc spray processes wherein alumina-cored aluminum wire is heated and melted by an electric arc and propelled as droplets and particles (e.g., distinct droplets of aluminum with partially or fully unmelted alumina particles) toward a surface by a gas stream. FIG. 4 shows an exemplary twin wire system 300 wherein the gun 302 has a nozzle 304 and an atomizing gas supply 306. A power supply 308 applies a voltage between wires 310A and 310B which converge to form an arc 312 and discharge a spray 314 toward the substrate. The exemplary wires are both alumina-cored aluminum. Various core forms may be used, in one example, the cores are a compact of a very coarse powder of angular morphology. Individual particles of the powder remain substantially unaltered in the spray intermixed with aluminum (or aluminum alloy) droplets from the sheath of the wire.

Figure 3:
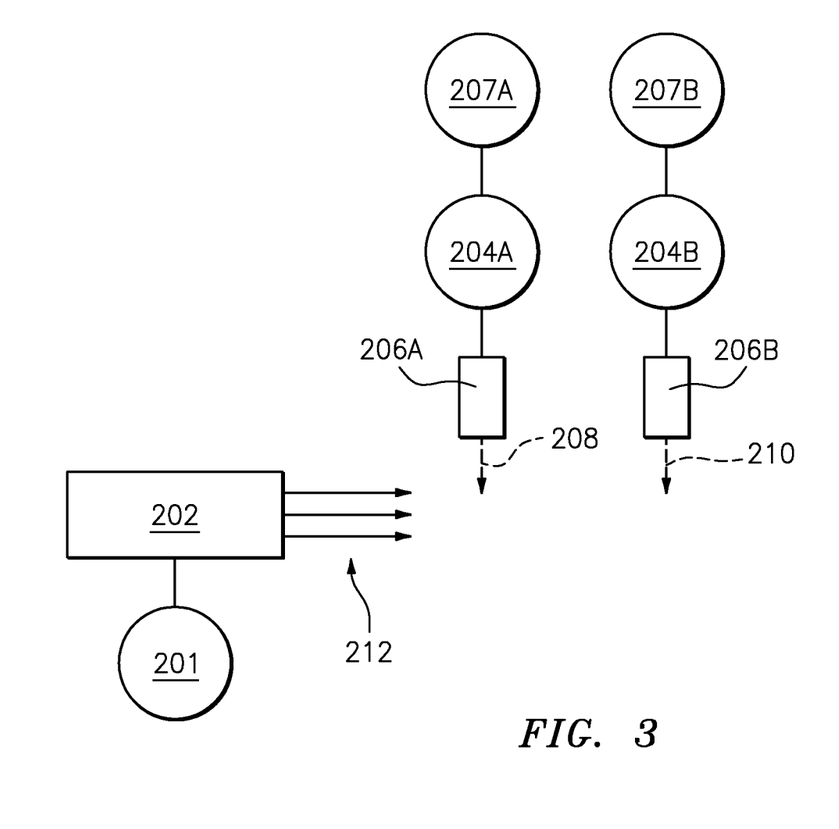
FIG. 3 is a view of a powder spray apparatus depositing an abrasive tip coating.

An exemplary volume fraction of alumina in the wires is at least 10%, more particularly, 20-50% or 30-50%. This may lead to a similar volume percentage of the as-deposited material. However, unmelted alumina particles may tend to deposit with a somewhat lower efficiency than the alumina matrix. This may lead to much higher percentages of matrix than abrasive relative to their original source amounts. For example, depending upon the implementation, exemplary alumina may deposit at one quarter its initial percentage. The powder sources of the system 200 may dispense powder in a similar ratio to yield a similar ratio in the coating. Depending on the relative attritions of abrasive and matrix in particular deposition techniques, feed rates may be selected to provide exemplary abrasive percentages in the overall abrasive layer of 10 percent to 50 percent by volume, more narrowly 10 percent to 20 percent or 10 percent to 20 percent. This may be contrasted with a base layer having much less or essentially no abrasive (e.g., no more than 10 percent or no more than 5 percent or no more than 2 percent).

Relative to uncoated tips or alternative coatings the exemplary coating may have one or more of several advantages. The aluminum based (e.g., pure aluminum) matrix on aluminum substrate combination may have good electrochemical compatibility from an aqueous corrosion perspective. The base layer may provide better overall adhesion due to a reduced delamination associated with peening effects. Base layer compositions may be particularly electrochemically tailored to be sacrificial to the blade substrate. In one group of examples, the base layer and matrix are the same material chosen to be electrochemically sacrificial to the substrate. In another group, the matrix may be sacrificial to the base layer and the base layer may be electrochemically matched to the substrate. In yet another group, the matrix is sacrificial to the base layer and the base layer is sacrificial to the substrate. Having the base layer be sacrificial to the matrix may be undesirable as contributing to delamination of the matrix due to corrosion of the base layer.

As an alternative to pure aluminum matrix material, aluminum alloys may be used as noted above. One possible use of aluminum alloy matrix is to use the matrix as a sacrificial anode relative to substrate material. Candidate matrix materials may be based on compositions used for galvanic protection of aluminum-hulled ships. Such protection as a blade coating has been proposed in PCT/US14/17701, published Sep. 25, 2014 as WO2014/149365 A1.

Table I below shows exemplary compositions:

TABLE I

Matrix Alloys for Substrate Galvanic Protection (Weight %)

| Element | Galvotec CW III* | Ex. 1 | Ex. 2 | Ex. 3 | Ex. 4 | Ex. 5 | Ex 6 | Ex 7 | Ex 8 |
|---|---|---|---|---|---|---|---|---|---|
| Zn | 4.75-5.75 | 1.0 to 7.5 | 1.0 to 7.5 | 1.0 to 7.5 | 1.0 to 7.5 | 1.0 to 7.5 | 1.0 to 7.5 | 2.0 to 7.0 | 2.0 to 5.0 |
| In, Sn, Cd, Ga, Hg | 0.016-0.020 | 0.010 to 0.20 In | 0.050 to 0.30 Sn | 0.020 to 0.050 Cd | 0.01 to 0.10 Ga | 0.01 to 0.10 hg | 0.01 to 0.40 combined | 0.01 to 0.4 combined | 0.01 to 0.30 combined |
| Si | 0.080-0.12 | 0.20 max | 0.20 max | 0.20 max | 0.20 max | 0.20 max | 0.20 max | 0.20 max | 0.20 max |
| Cu | 0.003 max. | 0.10 max | 0.10 max | 0.10 max | 0.10 max | 0.10 max | 0.10 max | 0.10 max | 0.10 max |
| Fe | 0.060 max. | 0.10 max | 0.10 max | 0.10 max | 0.10 max | 0.10 max | 0.10 max | 0.10 max | 0.10 max |
| Al | Bal. | Bal. | Bal. | Bal. | Bal. | Bal. | Bal. | Bal. | Bal. |

*Trademark of Galvotec Alloys, Inc., Harvey, Louisiana.

The aluminum-based matrix (and base layer material if different) is relatively low modulus so that it causes less of a fatigue debit (as opposed to a high modulus coating which at a coating defect or edge will cause a relatively higher stress concentration in the substrate and therefore create a more likely initiation site for cracking), is soft and has a low melting point so that it wears away at relatively lower surface temperature during rub (e.g., rub with a glass filled abradable case liner or blade outer air seal coating).

Exemplary base layer material may thus be at least an exemplary 30% softer (less hard) than the substrate material at standard conditions and may have a yield strength at least 30% less. Broader ranges on these are at least 25% less or at least 20% less or at least 15% less in any possible combination.

Melting point limits the maximum temperature that can be caused by frictional heating. Low melting point of aluminum (compared with prior art nickel matrix), means that there is significant softening as the contact surface heats up, thereby reducing forces and heat generation compared with the nickel. In wearing away, it further reduces rub temperature by exposing hard alumina abrasive phase. Aluminum properties of the substrate are very temperature sensitive. The spray process using aluminum matrix can keep the part temperature low (e.g., potentially as low as 200° F. (93° C.)) and not harm the base metal properties.

In general, exemplary matrix or base layer particle size is 10 micrometer to 150 micrometers. More particularly, a characteristic size (mean, median, or modal from the volume point of view) is 10 micrometers to 90 micrometers or 15 micrometers to 45 micrometers. Exemplary size is measured as the least dimension (e.g., the minor axis of an ellipsoid). Exemplary powder is Metco 54NS from Sulzer Metco (US) Inc. Westbury, N.Y. (99+% Al; 45 micrometers to 90 micrometers). Exemplary Al—Si is Metco 52C-NS from Sulzer Metco (US) Inc. Westbury, N.Y. (Al 12Si; 45 micrometers to 90 micrometers).

For each of the ranges with 0.20 max Si, 0.10 max Cu, and 0.10 max Fe, one to all of these ranges may be narrowed to respective values of 0.15 max Si, 0.010 max Cu, and 0.060 max Fe. An alternative Zn content for Ex. 7 or 8 would be 4.0 to 6.0 weight percent.

The Zn provides the principal effect on galvanic potential relative to Al. Thus, exemplary alloys may comprise the Al and Zn. Zn content may be selected to keep the matrix anodic to the substrate, thus, higher Zn in the substrate will likely be associated with higher Zn in the matrix.

The In, Sn, Cd, Ga, and/or Hg tend to hinder the protective self-oxidation of the basic Al—Zn mixture to assist in ability to sacrifice.

Si, if present, may help control microstructure. Thus, variations on the examples above where only a max Si is specified could include a min Si of 0.050 weight percent.

Other elements beyond the Al and Zn may be present in standard impurity levels or at non-impurity levels that do not substantially compromise galvanic protection (e.g., that do not reduce the difference in potential relative to the substrate by more than 50% compared with the basic potential associated with the Al—Zn combination in the ratio present in that matrix). Exemplary other elements would be expected to aggregate not more than 5.0 weight percent or 3.0 weight percent or 1.0 weight percent and would typically be present individually at not more than 1.5 weight percent or 1.0 weight percent.

Exemplary substrate alloys include 2000-series and 7000-series high stress aluminum alloys. Exemplary alloys are at least 80.0 weight percent Al, more particularly at least 85.0, with an exemplary 85.0-96.0. Table II below shows exemplary compositions:

TABLE II

Substrate Alloys Subject to Galvanic Protection (Weight %)

| | Alloy | | | | |
|---|---|---|---|---|---|
| Element | AA7255 | AA2060 | AA2099 | Range 1 | Range 2 |
| Al | Remainder | Remainder | Remainder | Remainder | Remainder |
| Cr | <=0.04 | | <=0.05 | <=0.05 | <=0.3 |
| Cu | 2.0-2.6 | 3.4-4.5 | 2.4-3.0 | 2.0-4.5 | 1.0-4.5 |
| Fe | <=0.09 | <=0.07 | <=0.07 | <=0.09 | <=0.15 |
| Li | | 0.60-0.90 | -2.0 | <=2.0 | <=3.0 |
| Mg | 1.8-2.3 | 0.60-1.1 | 0.1-0.5 | 0.1-2.3 | 0.05-3.0 |
| Mn | 0.05 | 0.10-0.50 | 0.1-0.5 | 0.10-0.50 | <=0.6 |
| Other, (each) | <=0.05 | <=0.05 | <=0.05 | <=0.05 | <=0.05 |
| Other, (total) | <=0.15 | <=0.15 | <=0.15 | <=0.15 | <=0.15 |
| Si | <=0.06 | <=0.07 | <=0.05 | <=0.07 | <=0.4 |
| Ag | | 0.05-0.50 | | <=0.50 | <=1.0 |
| Ti | <=0.06 | <=0.10 | <=0.10 | <=0.10 | <=0.25 |
| Zn | 7.6-8.4 | 0.30-0.50 | 0.40-1.0 | 0.3-8.4 | 0.1-10.0 |
| Zr | 0.08-0.15 | 0.05-0.15 | 0.05-0.12 | 0.05-0.15 | <=0.25 |

Additional substrate candidates include developmental alloys containing additional components such as Sc, Co, and Y.

Similar application techniques to those mentioned above may be used as may similar abrasives. Additional abrasives may also be used including but not limited to carbides (e.g., titanium carbide), borides (e.g., titanium boride) nitrides (e.g., titanium nitride), diamond like carbon, quartz, and the like. Other spray techniques may also be utilized. Such abrasives may have a wide range of characteristic particle sizes.

An exemplary range is 15 micrometers to 250 micrometers or 30 micrometers to 200 micrometers or 50 micrometers to 200 micrometers. Due to distribution uniformity issues, it may be that only a by weight majority of the abrasive falls within a general range such as these.

The as-deposited matrix, may have the same composition as the source matrix material (e.g., of Table I) at least away from very slight diffusion zones around the abrasive particles (e.g., carbides and borides as abrasives will have relatively low reactivity or diffusion with the matrix).

To provide desirable protection, exemplary matrix alloys are sufficiently more anodic than the substrates they protect. One measurement is standard electrode potential by which the matrix alloys may be at least 300 millivolt more active than the substrate alloys they protect, more broadly at least 275 millivolts. An exemplary range is 100 millivolts to 400 millivolts, more narrowly 275 millivolts to 325 millivolts.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade comprising:
    an airfoil having:
        a root end and a tip;
    a metallic substrate along at least a portion of the airfoil;
    an abrasive tip coating consisting of an abrasive and an aluminum-based matrix; and
    an aluminum-based base layer between the tip coating and the substrate wherein the matrix is galvanically sacrificial to the base layer and the substrate, wherein the matrix and the base layer are softer than the substrate.

2. The blade of claim 1 wherein the base layer is free of the abrasive.

3. The blade of claim 1 wherein:
    the base layer has a yield strength at least 30% less than a yield strength of the substrate.

4. A blade comprising:
    an airfoil having:
        a root end and a tip;
    an aluminum-based metallic substrate along at least a portion of the airfoil;
    an abrasive tip coating comprising an abrasive and an aluminum-based matrix; and
    an aluminum-based base layer between the tip coating and the substrate wherein the matrix is galvanically sacrificial to the base layer and the substrate and comprises, by weight percent:
        2.0 to 7.0 Zn;
        0.01 to 0.4 combined In, Sn, Cd, Ga, and Hg;
        0.20 max. Si;
        0.10 max. Cu;
        0.10 max. Fe; and
        balance Al with not more than 3.0 aggregate of all other elements.

5. A method for manufacturing a blade, the blade comprising:
    an airfoil having:
        a root end and a tip;
    a metallic substrate along at least a portion of the airfoil; and
    an abrasive tip coating comprising an abrasive and an aluminum alloy matrix,
the method comprising:
    simultaneous spraying of the matrix and the abrasive with at least partial melting of particles forming the matrix; and
    prior to the simultaneous spraying, spraying an aluminum-based base layer atop the substrate with at least partial melting of particles forming the base layer, wherein the aluminum alloy is galvanically sacrificial to the base layer and the substrate.

6. The method of claim 5 wherein the abrasive is a non-oxide abrasive.

7. The method of claim 5 wherein the base layer is sprayed to a thickness of 0.5 to 4.0 times a characteristic dimension of particles of the abrasive.

8. The method of claim 5 wherein the base layer is sprayed to a thickness of 13 micrometers to 0.90 millimeter.

9. The method of claim 5 wherein:
    the abrasive tip coating has a content of the abrasive of at least ten volume percent.

10. The method of claim 5 wherein:
    the matrix is at least 75 weight percent aluminum; and
    the abrasive fills the matrix to at least 10 volume percent of the abrasive tip coating.

11. The method of claim 5 wherein:
  the tip coating has a characteristic thickness of 0.1 mm to 0.3 mm.

12. The method of claim 5 wherein:
  the abrasive has a characteristic size of 30 micrometers to 200 micrometers.

13. The method of claim 5 further comprising:
  applying a polymeric coating to a pressure side and a suction side of the airfoil.

14. The method of claim 5 wherein:
  the simultaneous spraying of the matrix and the abrasive is without melting of particles forming the abrasive.

15. A blade manufactured according to the method of claim 5.

16. A rotor comprising a circumferential array of blades of claim 15.

17. A gas turbine engine comprising:
  the rotor of claim 16; and
  a case encircling the rotor and having:
   a substrate; and
   a coating on an inner surface of the substrate facing the rotor.

18. A method for using the blade of claim 15, the method comprising:
  causing the tip coating to abrade an adjacent coating.

* * * * *